Patented Feb. 13, 1940

2,190,372

UNITED STATES PATENT OFFICE 2,190,372

MANUFACTURE OF ADHESIVES

Julius R. Adams, Westfield, Mass., assignor to Old Colony Envelope Company, Westfield, Mass.

No Drawing. Application August 18, 1937, Serial No. 159,797. Renewed June 7, 1939

8 Claims. (Cl. 134—23.4)

This invention relates to improvements in the manufacture of adhesives and is directed more particularly to the provision of a novel method of making adhesives for use in the manufacture of envelopes and the like and the product thereof.

The principal objects of the invention are to provide adhesives of the so-called remoistening type and, as special features, the adhesives of this invention are capable of regaining strength when moistened, dry rapidly, and have a high gloss. Furthermore, the adhesives of this invention, as is desirable with gums of this type, have particularly satisfactory taste properties.

It is a further object of the invention to provide adhesives for use in the envelope art having increased adhesive strength and which adhere satisfactorily to all kinds of paper of which envelopes are commonly made.

It is well known that after application of the ordinary adhesives to the envelopes, the paper naturally contracts more or less either through drying of the moistened fibers or contraction of the gum film. The adhesives dry, of course, partly because of absorption by the paper and partly because of surface evaporation.

According to this invention, I provide adhesives which are sufficiently hygroscopic to control the usual contraction tendency and, in this way, I prevent the usual curling of the envelope flap bearing the adhesives as well as warping of that part of the envelope body with which the folded flap is in contact. Thus the envelopes of my invention may be more efficiently and easily printed upon or otherwise machined than can envelopes which have been distorted by the less satisfactory adhesives.

Various other objects and advantages of the invention will become more apparent after a reading of the following description.

According to the method of the invention I mix a certain novel dispersing agent with dextrin and this mixture is then cooked at from 140–180° F. for a period of time. Then I add one or more of a certain group of other materials which, I have found, help overcome the above-mentioned objections.

The gums of this invention may be dried in the same manner as other adhesives and they require only about the same degree and time of heating. Thus the envelopes of this invention may be packed and shipped as soon after manufacture as other envelopes.

Specifically I use as a dispersing agent a water solution of some water soluble ether. Such substances as the mono-ethyl ether, the mono-methyl ether, and the mono-butyl ether, of ethylene glycol are particularly desirable because, I have found, they are water soluble and mix readily with dextrin, either with or without cooking. Other water soluble ethers which are satisfactory dispersing agents are the mono-ethyl ether, the mono-methyl ether, the mono-butyl ether, and the diethyl ether of diethylene glycol.

After the intimate mixing of one or more of the just-mentioned dispersing agents and dextrin, I add a relatively small amount of some salicyclic acid derivative. Methyl salicylate, phenyl salicylate, or a mixture of both, are suitable.

This whole mixture is then cooked as above described. To the cooked mass is added a certain amount of what I call a hygroscopic agent. Preferably this consists of a five-carbon polyhydroxy alcohol such as sorbitol. This is particularly suitable as it is also soluble in water, disperses well in the adhesive and it is a non-volatile substance having an especially wide and useful hygroscopic range.

According to the preferred form of the invention, I add to the mixture after the adhesive has cooled a small amount of phosphoric acid. This substance tends to increase the adhesive properties of the gum.

Special advantages of the adhesives including a water-soluble ether, a five-carbon polyhydroxy alcohol and a salicylic acid derivative are that they are capable of spreading more evenly over the envelope flap and are glossier in appearance. All of this is important from a commercial standpoint as the average consumer notices immediately whether the gum is evenly spread and has a gloss.

Furthermore, because of the hygroscopic nature of these new adhesives, the flaps of the envelopes to which they are applied under normal conditions remain straight and flat and even when heated to temperatures sufficient to scorch the paper return to a normal flat condition if there has been a slight tendency to curl. That is, they do not curl as do ordinary-gummed envelopes with the result that my envelopes may be more readily and efficiently subjected to any desired machining operations, such as printing or the like, than can the envelopes heretofore known which have curled flaps and distorted or warped areas in the envelope body adjacent to the adhesive.

Specific proportions of the above-mentioned materials which have been found to provide an adhesive having the desired non-distorting qualities are as follows: about four parts of water to one part of the water-soluble ether; between four and twelve parts of dextrin; less than one part of the salicylic acid derivative; about one part of the polyhydroxy alcohol; and less than one part of the phosphoric acid.

As stated, this adhesive dries as readily as prior art gums and yet it is hygroscopic to the desired degree so that flaps bearing the same do not curl, but remain flat and straight during manufacture. Since they do not curl, they consequently do not form the mold-like curve which tends to distort or warp the part of the envelope body with which the gummed and folded flap is in contact, as is the case with envelopes bearing ordinary gums.

Furthermore, I have found, the adhesive strength of my gums not only have these new desired qualities but also increased adhesive strength. Also, the gums are not as likely to be over-moistened and washed off the flaps as are ordinary adhesives.

Still further, these new gums are of such a nature that they tend to cut down the amount of water absorbed by the paper and at the same time what water that is absorbed is distributed more uniformly through the paper. This results in the elimination of distortion and provides smooth, flat-lying flaps.

While I have described the invention in great detail, it is not desired to be limited to such detail as many modifications may be made therein without departing from the spirit and scope of the invention. What it is desired to secure by Letters Patent of the United States is:

1. A remoistening adhesive of the class described comprising in combination, dextrin, a dispersing agent consisting of a water solution of a water-soluble ether, and an aliphatic polyhydroxy alcohol having more than four carbon atoms and possessing hydroscopic properties.

2. A remoistening adhesive of the class described comprising in combination, dextrin, a dispersing agent consisting of a water solution of a water-soluble ether, and an aliphatic polyhydroxy alcohol consisting of sorbitol.

3. A remoistening adhesive of the class described comprising in combination, dextrin, a dispersing agent consisting of a water solution of a water-soluble ether, a hygroscopic agent consisting of sorbitol, and methyl salicylate.

4. A remoistening adhesive of the class described comprising in combination, dextrin, a dispersing agent consisting of a water solution of a water-soluble ether, a hygroscopic agent consisting of sorbitol, and phenyl salicylate.

5. As a new article of manufacture, a remoistening adhesive of the class described comprising in combination, dextrin, a dispersing agent consisting of a water solution of a water-soluble ether, and a hydroscopic agent consisting of an aliphatic polyhydroxy alcohol having more than four carbon atoms.

6. As a new article of manufacture, a remoistening adhesive of the class described comprising in combination, dextrin, a dispersing agent consisting of a water solution of a water-soluble ether, and a member of a group consisting of phenyl and methyl salicylate.

7. As a new article of manufacture, a remoistening adhesive of the class described comprising in combination, dextrin, a dispersing agent consisting of a water solution of a water-soluble ether, a member of a group consisting of phenyl and methyl salicylate, and a hydroscopic agent consisting of a member of a group including an aliphatic polyhydroxy alcohol having more than four carbon atoms.

8. As a new article of manufacture, a remoistening adhesive of the class described comprising in combination, dextrin, a dispersing agent consisting of a water solution of a water-soluble ether, a member of a group consisting of phenyl and methyl salicylate, and a hydroscopic agent consisting of a member of a group including an aliphatic polyhydroxy alcohol having more than four carbon atoms, and phosphoric acid.

JULIUS R. ADAMS.